(12) United States Patent
Cheung et al.

(10) Patent No.: US 9,211,028 B2
(45) Date of Patent: Dec. 15, 2015

(54) COOKING AND STIRRING MACHINE

(71) Applicant: Huiyang Allan Plastic & Electric Industries Co., Limited, Guangdong Province (CN)

(72) Inventors: Shu Sang Cheung, Guangdong Province (CN); To Yin Pang, Guangdong Province (CN)

( * ) Notice: Subject to any disclaimer, the term of this patent is extended or adjusted under 35 U.S.C. 154(b) by 179 days.

(21) Appl. No.: 13/935,575

(22) Filed: Jul. 5, 2013

(65) Prior Publication Data

US 2014/0116262 A1 May 1, 2014

(30) Foreign Application Priority Data

Oct. 31, 2012 (CN) .................. 2012 2 0563868 U

(51) Int. Cl.
*A47J 43/046* (2006.01)
*A47J 43/08* (2006.01)
*A47J 27/00* (2006.01)
*A47J 43/07* (2006.01)
*F16H 3/00* (2006.01)

(52) U.S. Cl.
CPC .............. *A47J 27/002* (2013.01); *A47J 27/004* (2013.01); *A47J 43/07* (2013.01); *A47J 43/085* (2013.01); *A47J 43/046* (2013.01); *F16H 3/005* (2013.01)

(58) Field of Classification Search
CPC ...... A47J 36/165; A47J 19/027; A47J 43/046; A47J 43/085; A23N 1/02; F16H 3/005; F16H 3/003
USPC .............................. 99/348, 510, 513
See application file for complete search history.

(56) References Cited

U.S. PATENT DOCUMENTS

| | | | | |
|---|---|---|---|---|
| 5,333,517 | A * | 8/1994 | Bryson et al. | 74/810.1 |
| 5,531,651 | A * | 7/1996 | Yang | 475/12 |
| 6,595,113 | B1 * | 7/2003 | Chang | 99/337 |
| 2006/0123996 | A1 * | 6/2006 | Pavlovic et al. | 99/348 |
| 2009/0000494 | A1 * | 1/2009 | Kim | 99/483 |
| 2012/0302390 | A1 * | 11/2012 | Lemire-Elmore et al. | 475/149 |

* cited by examiner

*Primary Examiner* — Reginald L Alexander
(74) *Attorney, Agent, or Firm* — Prakash Nama; Global IP Services, PLLC

(57) ABSTRACT

A cooking and stirring machine having a machine base, a cup body for accommodating food, and a cup lid; the bottom of the cup body is installed with a heating element and an upper connector which drives a processing tool; the base bottom is installed with a fan and a motor; the upper end of the motor is provided with an output shaft, a drive shaft, and a lower connector which is installed on the drive shaft and matched with the upper connector; the output shaft and the drive shaft are connected through a one-way bearing. The cooking and stirring machine can heat food with stirring; in addition, the setting of the reduction gear set and plural one-way bearings realizes the function of outputting different rotation speeds when the motor rotates clockwise and anticlockwise.

4 Claims, 6 Drawing Sheets

COOKING AND STIRRING MACHINE

BACKGROUND OF THE INVENTION

The utility model belongs to the field of food processing, in particular to a cooking and stirring machine with high and low-speed stirring functions.

The traditional food stirrer usually adopts a single-speed motor as a power source and then reduces the stirring speed through a mechanical variable speed mechanism or speed reduction mechanism. However, this kind of stirrer available on the market has a small speed change, cannot meet the demands on stirring of various objects and has low efficiency. Moreover, the food stirrers controlling the stirring speed through voltage adjustment are also available on the market, but those kinds of stirrers have poor stability and reliability.

Although there are various stirrers, most have no heating function and cannot heat directly, so heating is required to be realized in another way. This makes operation very inconvenient and costs much time and labor. Some stirrers have heating function, but are complicatedly structured, or adopt the means of stirring first and then heating and cannot stir and heat at the same time.

BRIEF SUMMARY OF THE INVENTION

Accordingly, the technical problem to be solved in the utility model is to provide a cooking and stirring machine which has high and low stirring speeds and can stir and heat at the same time.

To solve the mentioned technical problem, the utility model adopts the following technical scheme:

A cooking and stirring machine comprising a machine base, a cup body for accommodating food and a cup lid, wherein the bottom of the cup body is installed with a heating element and an upper connector which drives a processing tool; the base bottom is installed with a fan and a motor; the upper end of the motor is provided with an output shaft, a drive shaft and a lower connector which is installed on the drive shaft and matched with the upper connector; and, the output shaft and the drive shaft are connected through a first one-way bearing; between the output shaft and the drive shaft is provided with a reduction gear set which realizes low rotation speed transmission between the output shaft and the drive shaft arrangement.

As improvement of the above scheme, said reduction gear set comprises a worm installed on the output shaft through a second one-way bearing, a worm wheel engaged with the worm, a first bevel gear coaxially synchronous to rotation of the worm wheel, a second bevel gear engaged with the first bevel gear, a first straight gear coaxially synchronous to rotation of the second bevel gear, and a second straight gear engaged with the first straight gear; the second straight gear is fixedly sleeved on the drive shaft; between the first straight gear and a rotating shaft of the first straight gear is a third one-way bearing; the second one-way bearing and the third one-way bearing are identical in rotation direction, while the first one-way bearing and the second one-way bearing are opposite in rotation direction.

As further improvement of the above scheme, the bottom of the cup body and the top of the machine base are provided with a butt-jointed conductor element which comprises a protection base higher than the upper end face of the machine base; inside the protection base is a contact conducting plate; the bottom of the cup body is provided with a conducting column which is matched with the contact conducting plate and penetrated into the contact conducting plate; and the conducting column is electrically connected with the heating element in the cup body. Moreover, the protection base is provided with a rubber protective jacket; and the rubber protective jacket is provided with a perforation through which the conducting column passes.

As further improvement of the above scheme, said heating element comprises a heating disc installed at the bottom of the cup body and a temperature sensor for sensing the temperature of the heating disc.

The cooking and stirring machine designed in the present utility model can heat food with stirring and therefore is practical and convenient; in addition, setting of the reduction gear set and plural one-way bearings realizes the function of outputting different rotation speeds when the motor rotates clockwise and anticlockwise. This cooking and stirring machine has a relatively large speed range and high stirring and cooking efficiency, for example, the user can first add the food into the jar and use the high speed to chop down the food into smaller pieces. Then the user can start the heating and operate the low-speed stirring during cooking. The low speed stirring ensures that no hot fluid will splash out during cooking. And the stirring also helps the food to be evenly and consistently cooked, thereby bringing out the full flavor of the food ingredients.

DETAILED DESCRIPTION OF THE INVENTION

To facilitate understanding of those skilled in this field, the utility model is further described with reference to the attached drawings and embodiments.

Figure 1:
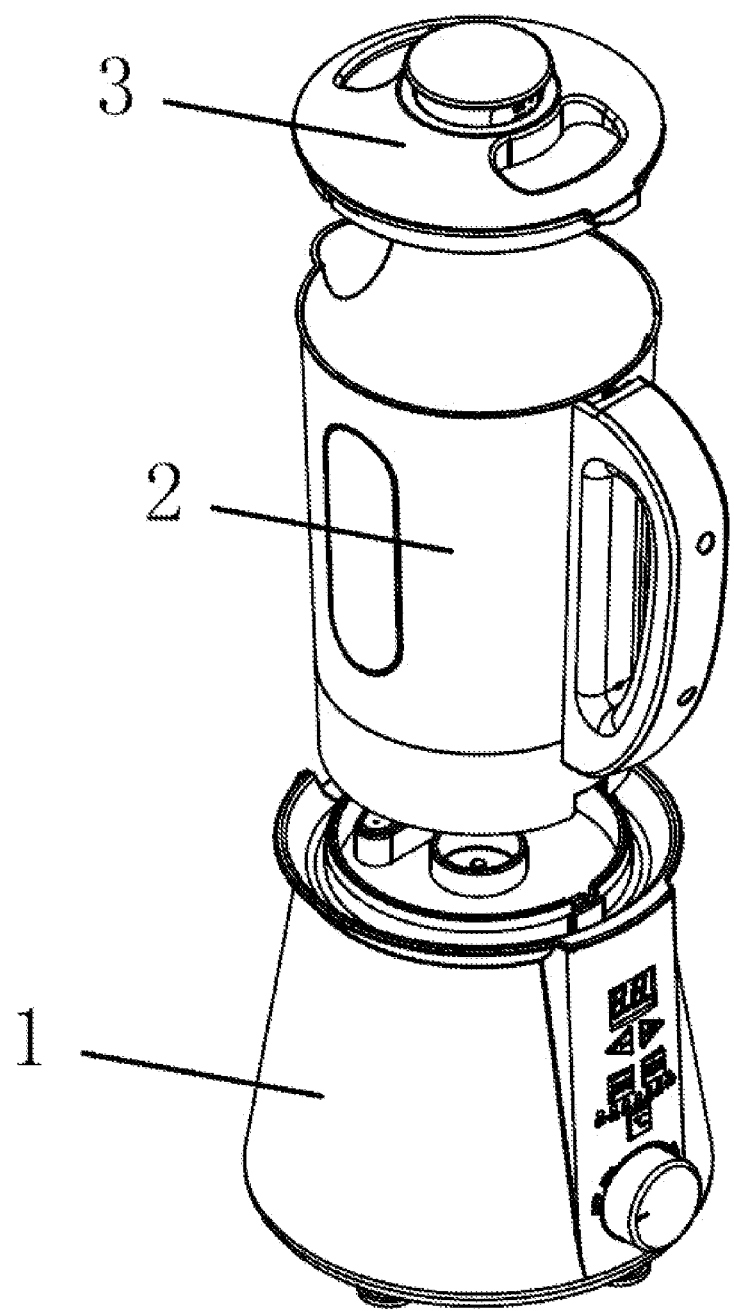
FIG. 1 is a structural view of an embodiment of this utility model.
Figure 2:
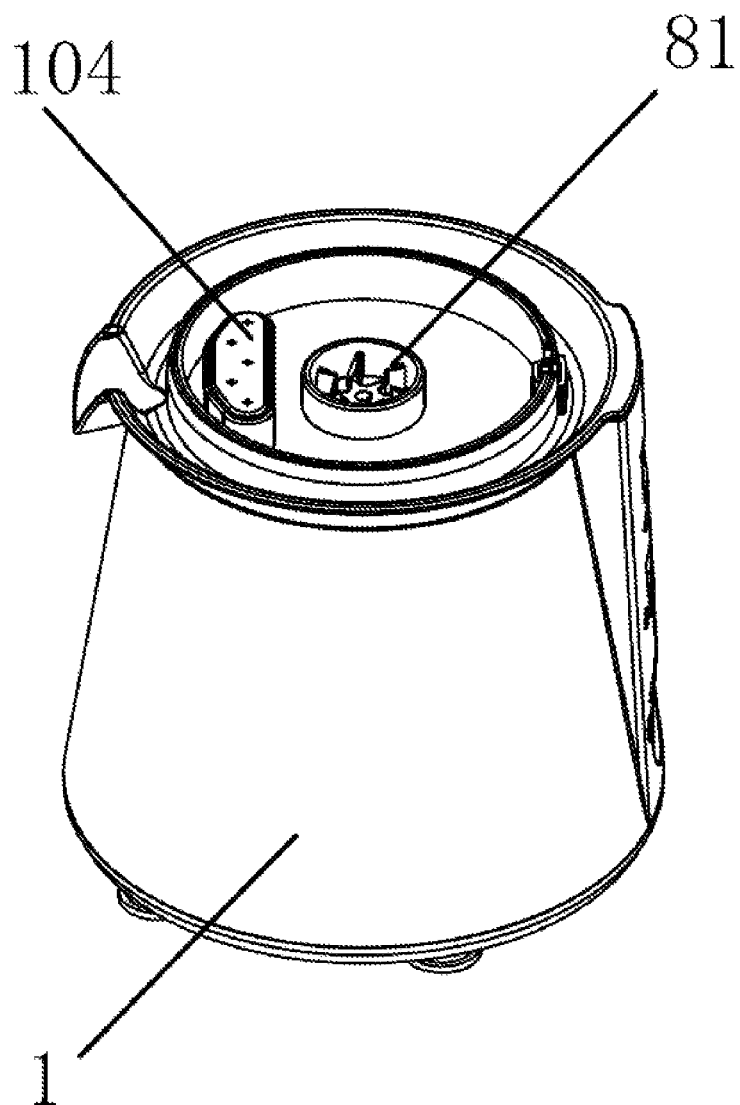
FIG. 2 is a structural view of the upper end face of the machine base of the embodiment of the present invention.
Figure 3:
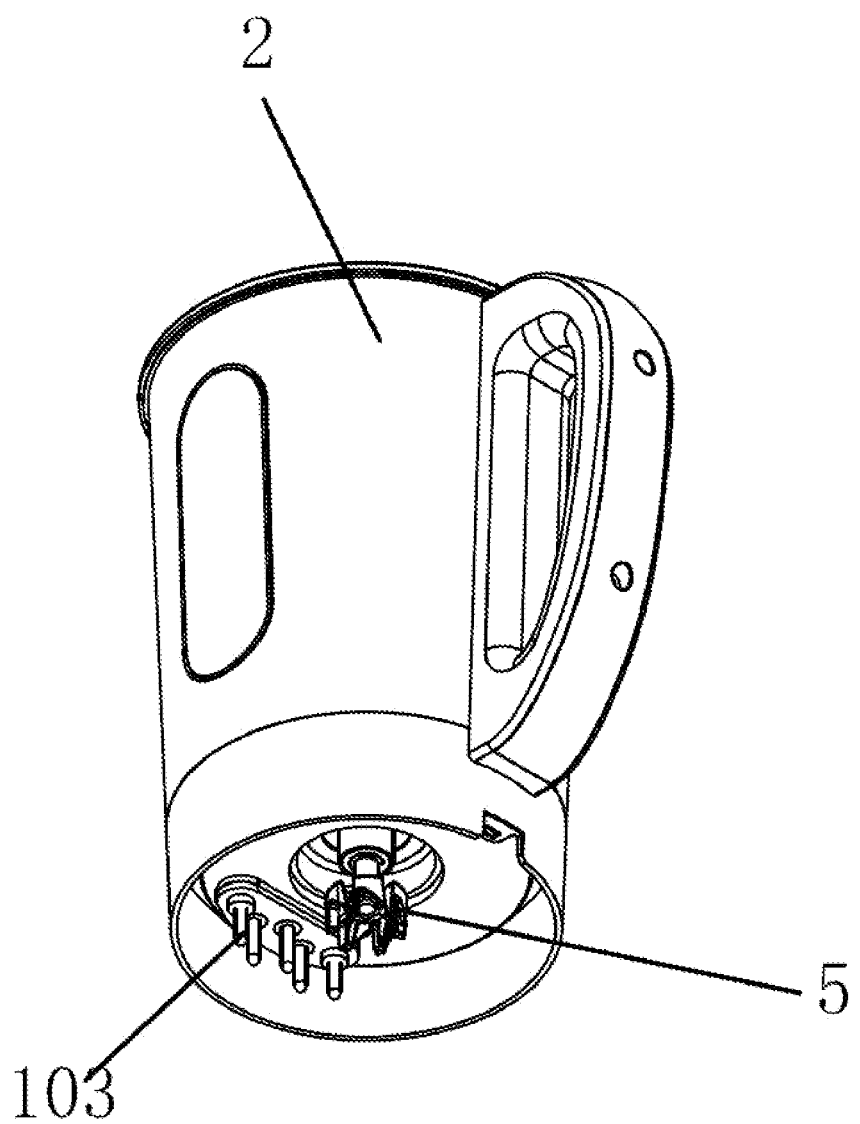
FIG. 3 is a structural view of the lower end face of the cup body of the embodiment of the present invention.
Figure 4:
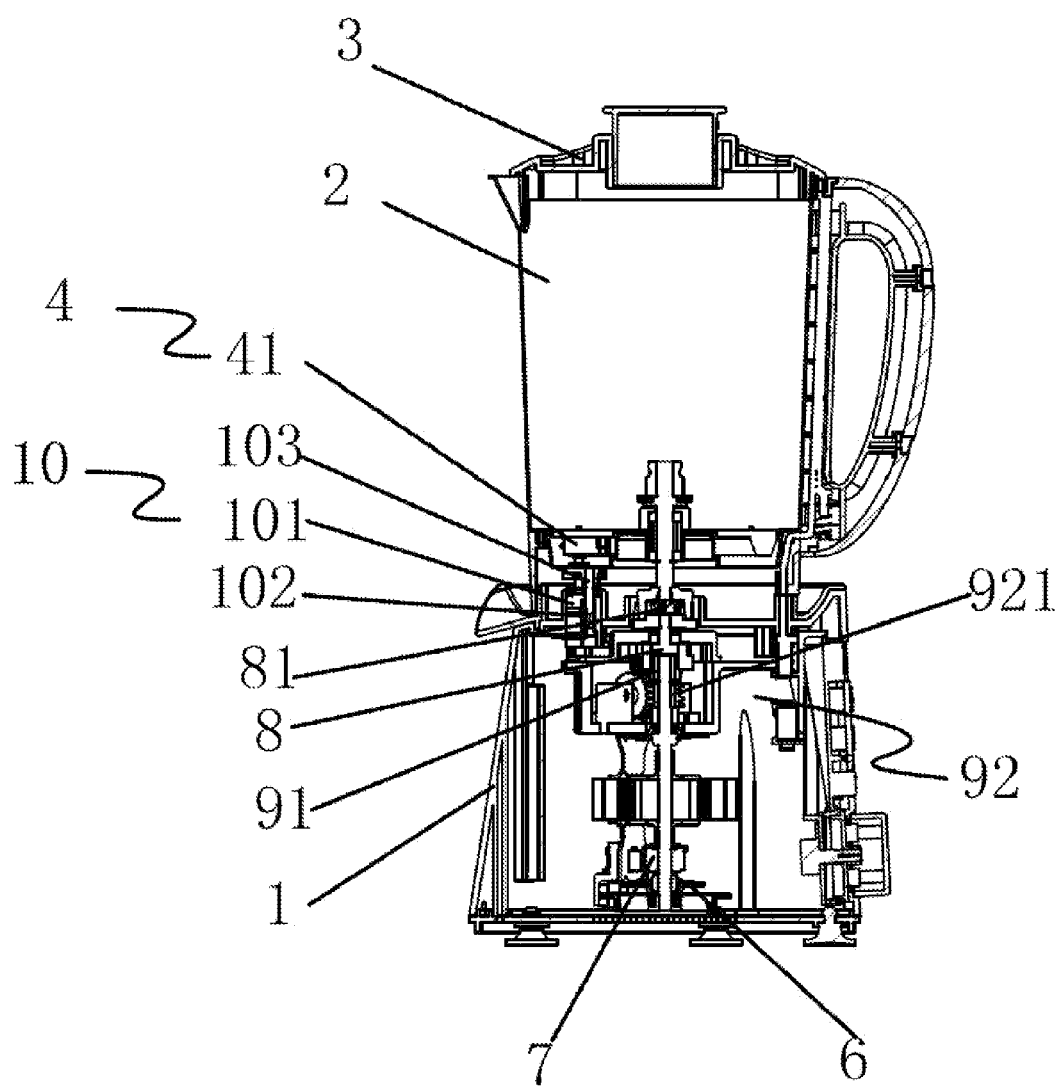
FIG. 4 is a structural view of the overall lengthwise section of the embodiment of the present invention.
Figure 5:
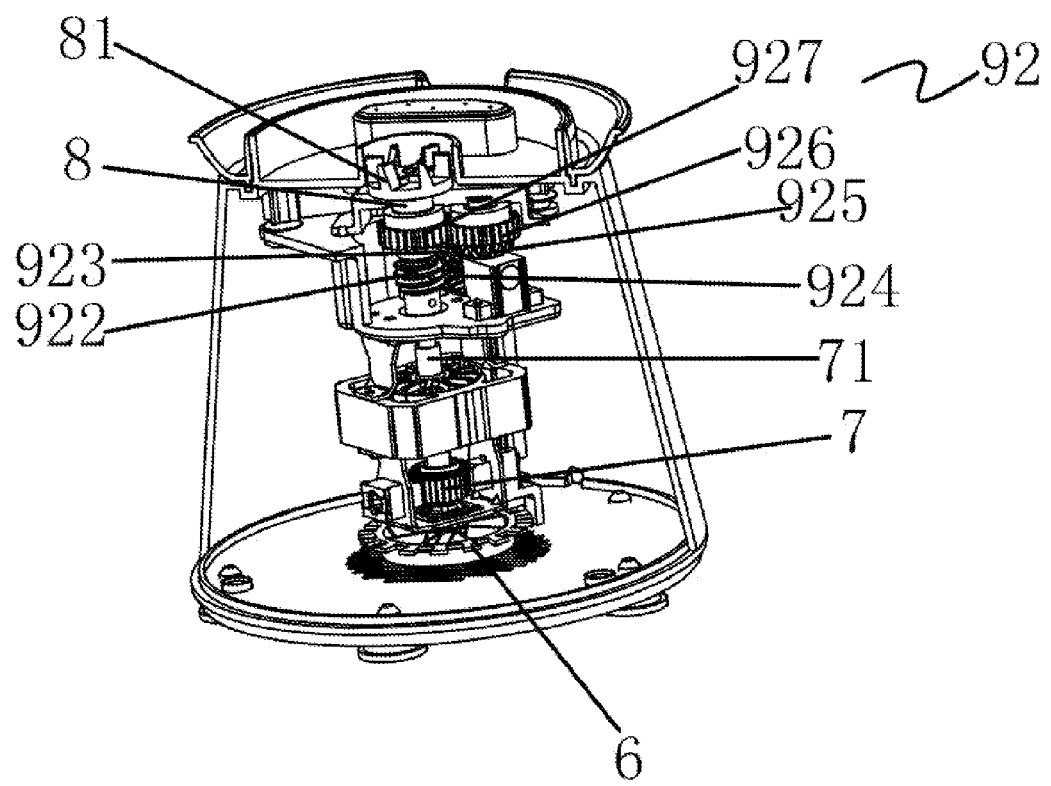
FIG. 5 is an internal structural view of the machine base of the embodiment of the present invention.
Figure 6:
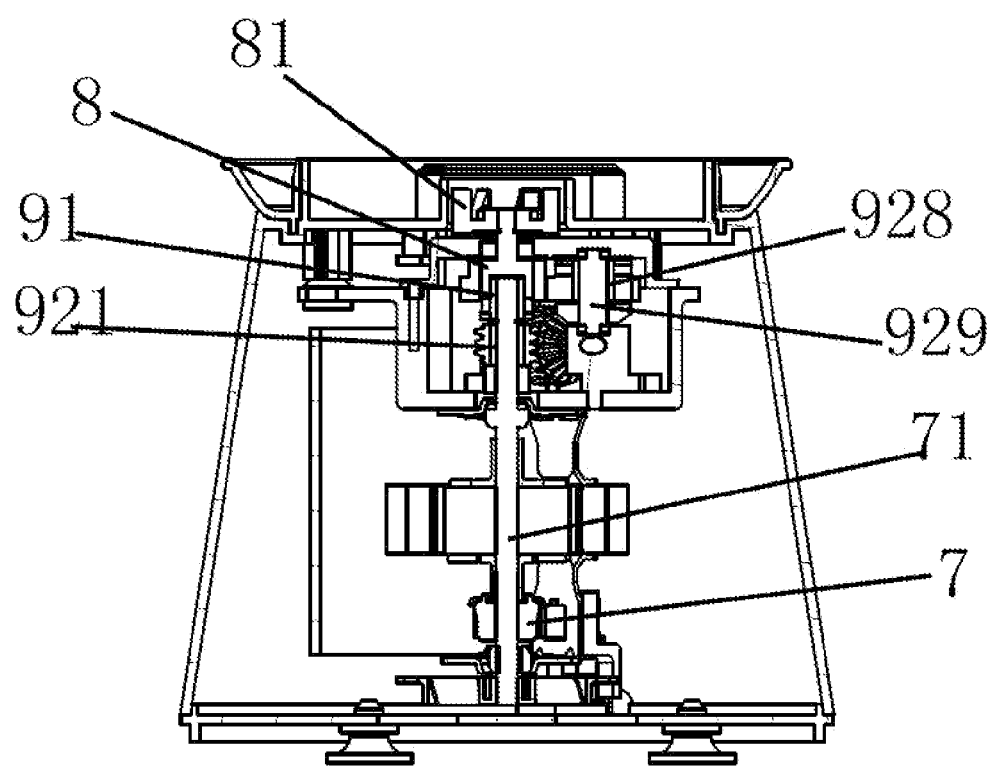
FIG. 6 is a structural view of the internal cross section of the machine base of the embodiment of the present invention.

The cooking and stirring machine disclosed in the utility model has functions of stirring and heating at the same time and can adjust the stirring speed. As shown in FIGS. 1-6, the cooking and stirring machine comprises a machine base 1, a cup body 2 for accommodating foods and a cup lid 3, wherein the bottom of the cup body 2 is installed with a heating element 4 and an upper connector 5 which drives processing tool; the bottom of the machine base 1 is installed with a fan 6 and a motor 7; the upper end of the motor 7 is provided in turn with an output shaft 71, a drive shaft 8 and a lower connector 81 which is installed on the drive shaft 8 and is matched with the upper connector 5; the output shaft 71, the drive shaft 8 and the lower connector 81 as well as the upper connector 5 are coaxially arranged. To realize adjustment of high and low stirring speeds, the output shaft 71 and the drive shaft 8 are connected through a first one-way bearing 91, and between the output shaft 71 and the drive shaft 8 is a reduction gear set 92 which realizes the low-speed transmission between the output shaft 71 and the drive shaft 8 arrangement.

Specifically speaking, the reduction gear set 92 comprises a worm 922 installed on the output shaft 71 through a second one-way bearing 921, a worm wheel 923 engaged with the worm 922, a first bevel gear 924 coaxially synchronous to rotation of the worm wheel 923, a second bevel gear 925 engaged with the first bevel gear 924, a first straight gear 926 coaxially synchronous to rotation of the second bevel gear 925, and a second straight gear 927 engaged with the first straight gear 926; the second straight gear 927 is fixedly sleeved on the drive shaft 8; between the first straight gear 926 and a rotating shaft 928 for installing the first straight gear 926 is a third one-way bearing 929; the second one-way bearing 921 and the third one-way bearing 929 are identical in rotation direction, while the first one-way bearing 91 and the second one-way bearing 921 are opposite in rotation direction. When the motor 7 rotates clockwise, the power is transmitted to the upper connector 5 through the output shaft 71, the drive shaft 8, the first one-way bearing 91 (in this direction, the first one-way bearing 91 is located in the locked direction, capable of realizing transmission of force) and the lower connector 81 in turn, thus realizing the high-speed rotation of the tool. When the motor 7 rotates anticlockwise, the first one-way bearing 91 is free in rotation direction, so the power cannot be transmitted from the drive shaft 8 to the lower connector 81, but is transmitted from the drive shaft 8 to the lower connector 81 through the second one-way bearing 921, the reduction gear set 92 and the third one-way bearing 929 and then to the upper connector 5 through the lower connector 81, thus realizing low-speed rotation of the tool.

The power source, for connecting with the mains supply, of the cooking and stirring machine designed in the utility model is installed in the machine base 1, so in order to conveniently realize electric conduction between the power source and the heating element 4, the bottom of the cup body 2 and the top of the machine base 1 are provided with butt-jointed conductor element 10. This conductor element 10 comprises a protection base 101 higher than the upper end face of the machine base 1; inside the protection base 101 is a contact conducting plate 102; the bottom of the cup body 2 is provided with a conducting column 103 which is matched with the contact conducting plate 102 and penetrated into the contact conducting plate 102; and the conducting column 103 is electrically connected with the heating element 4 in the cup body 2. The design of the conductor element 10 can effectively prevent water from entering the conductor element 10 to avoid electric leakage. The heating element 4 in the utility model comprises a heating disc 41 installed at the bottom of the cup body 2 and a temperature sensor (not shown in the figures) for sensing the temperature of the healing disc 41. To protect safety when the conductor element 10 and the heating element 4 are electrically connected, the protection base 101 is provided with a rubber protective jacket 104; and the rubber protective jacket 104 is provided with a perforation 105 through which the conducting column 103 passes.

The embodiment is realized by the following method:

Place food in the cup body 2, fill water, close the cup lid 3, set heating temperature and stirring speed, and then the motor starts to rotate. When the motor and the output shaft of the motor rotate clockwise, the first one-way bearing 91 directly drives the drive shaft and the upper connector to rotate clockwise at a high speed, thus driving the processing tool to stir and chip; when the motor and the output shaft of the motor rotate anticlockwise, the second one-way bearing 921 drives the worm to rotate; the worm drives the worm wheel to rotate; the worm wheel drives the first bevel gear 924 to rotate; the first bevel gear 924 drives the second bevel gear 925 to rotate so as to drive the first straight gear 926 to rotate; the first straight gear 926 drives the second straight gear 927 to rotate; the second straight gear 927 drives the third one-way bearing 929 to rotate; the third one-way bearing 929 drives the drive shaft and the upper connector to rotate clockwise at a low speed by the gear reduction speed which reduces the speed; and the upper connector rotates to drive the process tools to stir the food. During stirring, the current is transmitted to the conducting column through the conductor element, and the conducting column is electrically connected with the heating element, thus realizing heating of the food.

The above embodiment only represent a specific realization means of the utility model and is described in detail, but it cannot be accordingly used as the limit of the scope of the utility model. It should not noted that, for those ordinary skilled in this field, modifications and improvements can be made, all without departing from the inventive concept of the utility model. Those obvious substitutions all belong to the protection scope of the utility model.

What is claimed is:

1. A cooking and stirring machine, comprising a machine base (1), a cup body (2) for accommodating food and a cup lid (3), wherein a bottom part of the cup body is installed with a heating element (4) and an upper connector (5) which drives a processing tool; a bottom part of the machine base is installed with a fan (6) and a motor (7); an upper end of the motor is provided with an output shaft (71), a drive shaft (8) and a lower connector (81) which is installed on the drive shaft and matched with the upper connector; characterized in that, the output shaft and the drive shaft are connected through a first one-way bearing (91); and, between the output shaft and the drive shaft is a reduction gear set (92) which realizes low rotation speed transmission between the output shaft and the drive shaft; said reduction gear set comprises a worm (922) installed on the output shaft through a second one-way bearing (921), a worm wheel (923) engaged with the worm, a first bevel gear (924) coaxially synchronous to rotation of the worm wheel, a second bevel gear (925) engaged with the first bevel gear, a first straight gear (926) coaxially synchronous to rotation of the second bevel gear, and a second straight gear (927) engaged with the first straight gear; the second straight gear is fixedly sleeved on the drive shaft; between the first straight gear and a rotating shaft (928) of the first straight gear is a third one-way bearing (929); the second one-way bearing and the third one-way bearing are identical in rotation direction, while the first one-way bearing and the second one-way bearing are opposite in rotation direction.

2. The cooking and stirring machine according to claim 1, characterized in that, the bottom part of the cup body and a top part of the machine base are provided with a butt-jointed conductor element (10) which comprises a protection base (101) higher than an upper end face of the machine base; inside the protection base is a contact conducting plate (102); the bottom part of the cup body is provided with a conducting column (103) which is matched with the contact conducting plate and penetrated into the contact conducting plate; and the conducting column is electrically connected with the heating element in the cup body.

3. The cooking and stirring machine according to claim 2, characterized in that, the protection base is provided with a rubber protective jacket (104); and the rubber protective jacket is provided with a perforation (105) through which the conducting column passes.

4. The cooking and stirring machine according to claim 3, characterized in that, said heating element comprises a heating disc (41) installed at the bottom part of the cup body and a temperature sensor for sensing the temperature of the heating disc.

* * * * *